(12) United States Patent
Kilgus

(10) Patent No.: US 7,866,054 B2
(45) Date of Patent: Jan. 11, 2011

(54) APPARATUS AND METHOD FOR INDICATING DIRECTION

(76) Inventor: Christopher R. Kilgus, 11455 Oceanview Ave., Felton, CA (US) 95018

( * ) Notice: Subject to any disclaimer, the term of this patent is extended or adjusted under 35 U.S.C. 154(b) by 82 days.

(21) Appl. No.: 12/386,505

(22) Filed: Apr. 17, 2009

(65) Prior Publication Data

US 2010/0095878 A1    Apr. 22, 2010

Related U.S. Application Data

(60) Provisional application No. 61/125,250, filed on Apr. 22, 2008.

(51) Int. Cl.
*G01C 1/00* (2006.01)
*G01C 21/00* (2006.01)
(52) U.S. Cl. ............... 33/268; 33/1 N; 33/534
(58) Field of Classification Search ............... 33/1 C, 33/1 H, 1 N, 1 SB, 1 SD, 268, 270, 271, 534
See application file for complete search history.

(56) References Cited

U.S. PATENT DOCUMENTS

| | | | | |
|---|---|---|---|---|
| 4,969,271 A | * | 11/1990 | Sump | 33/1 SD |
| 5,396,709 A | * | 3/1995 | Swan, Jr. | 33/268 |
| 5,435,067 A | * | 7/1995 | Uchida et al. | 33/1 N |
| 6,854,190 B1 | * | 2/2005 | Lohmann | 33/1 SB |
| 6,871,407 B1 | * | 3/2005 | Maegli | 33/270 |
| 7,076,879 B2 | * | 7/2006 | Murphy | 33/1 N |
| 2005/0120570 A1 | * | 6/2005 | Bastian | 33/268 |
| 2005/0210688 A1 | * | 9/2005 | Stephens | 33/1 N |
| 2006/0112575 A1 | * | 6/2006 | Moran | 33/268 |
| 2008/0256810 A1 | * | 10/2008 | Akihary | 33/1 N |
| 2009/0320308 A1 | * | 12/2009 | Marcum | 33/534 |

\* cited by examiner

*Primary Examiner*—G. Bradley Bennett
(74) *Attorney, Agent, or Firm*—Michael A. Guth

(57) ABSTRACT

A pointing device adapted to allow a user to set a pointing arrow to point towards another location, such as a city in another country. The pointing arrow is adapted to not point in a direction along the surface of the earth but to point accurately through the Earth. An apparatus including a pointing device and a calculation portion adapted to allow the user to determine how to point the pointing arrow towards the desired location. The calculation portion may include an electronic device and may include the use of a global computer network.

17 Claims, 6 Drawing Sheets

|  | Atlanta, GA | Boston, MA | Chicago, IL | Cincinnati, OH | Dallas, TX | Denver, CO |
|---|---|---|---|---|---|---|
| Anchorage, AK | 25:325 | 24:321 | 21;320 | 22;322 | 22;326 | 17;323 |
| Auckland, NZ | 59:242 | 65:253 | 59;245 | 50;245 | 54;237 | 53;235 |
| Baghdad, Iraq | 49:041 | 42:049 | 46;039 | 47;041 | 52;033 | 51;026 |
| Bangkok, Thai | 66:354 | 62:010 | 62;351 | 64;354 | 65;338 | 61;331 |
| Barcelona, Spain | 33:055 | 26:065 | 32;057 | 32;057 | 37;050 | 38;048 |
| Beijing, China | 52;344 | 49;354 | 48;342 | 49;344 | 51;335 | 46;329 |
| Bogota, Colum. | 15;160 | 19;185 | 20;158 | 18;162 | 18;138 | 22;133 |
| Cape Town, SA | 59;114 | 56;117 | 61;108 | 60;111 | 63;110 | 67;079 |
| Casablanca | 31;066 | 25;078 | 31;069 | 30;069 | 36;061 | 37;059 |
| Delhi, India | 58;018 | 52;028 | 54;014 | 55;017 | 59;006 | 56;356 |
| Hanoi, Vietnam | 62;349 | 58;003 | 58;346 | 60;349 | 61;335 | 56;329 |
| Hong Kong, Ch | 61;340 | 57;355 | 56;338 | 58;341 | 59;328 | 54;322 |
| Honolulu, HI | 33;280 | 37;284 | 31;274 | 32;277 | 27;274 | 24;264 |
| Islamabad, Pak | 55;020 | 49;030 | 51;016 | 52;019 | 57;009 | 53;002 |
| Jerusalem, Israel | 47;048 | 40;056 | 45;046 | 45;048 | 51;040 | 50;034 |
| Lisbon, Portugal | 30;062 | 23;073 | 29;065 | 28;064 | 34;057 | 35;056 |
| London, England | 30;045 | 23;048 | 29;048 | 29;048 | 34;042 | 34;041 |
| Manila, Phil. | 63;329 | 61;346 | 59;328 | 61;331 | 60;317 | 55;312 |
| Mecca | 52;052 | 45;061 | 50;049 | 50;051 | 56;044 | 55;035 |
| Melbourne, AU | 80;213 | 86;197 | 82;235 | 82;224 | 76;224 | 43;337 |
| Mexico City | 10;226 | 16;234 | 12;207 | 12;217 | 07;189 | 10;164 |
| Moscow, Russia | 39;029 | 32;036 | 36;050 | 37;030 | 42;024 | 40;021 |
| North Pole | 28;000 | 24;000 | 24;000 | 25;000 | 29;000 | 25;000 |
| Paris, France | 32;048 | 25;056 | 30;050 | 30;050 | 36;044 | 35;042 |
| Rio de Janeiro | 34;139 | 35;153 | 38;139 | 37;141 | 38;130 | 43;125 |
| Rome, Italy | 36;051 | 30;059 | 35;051 | 35;052 | 41;045 | 40;042 |
| Santiago, Chile | 34;168 | 38;180 | 39;166 | 37;168 | 35;157 | 40;151 |
| Singapore | 72;346 | 68;007 | 68;344 | 69;347 | 70;326 | 66;320 |
| South Pole | 62;180 | 66;180 | 66;180 | 65;180 | 61;180 | 65;180 |
| Stockholm, Swed | 34;033 | 27;039 | 31;034 | 31;034 | 37;029 | 35;027 |
| Tehran, Iran | 50;035 | 43;044 | 47;032 | 48;035 | 53;027 | 51;020 |
| Tokyo, Japan | 50;325 | 49;335 | 46;323 | 47;325 | 47;317 | 42;312 |

| Honolulu, HI | Los Angelos, CA | Miami, FL | New Oreleans, LA | New York, NY | Phoenix, AZ | San Diego, CA | San Francisco, CA | Seattle WA | Washington, DC |
|---|---|---|---|---|---|---|---|---|---|
| 20;006 | 17;333 | 29;328 | 25;327 | 24;322 | 18;331 | 18;333 | 14;333 | 10;321 | 24;322 |
| 32;207 | 47;228 | 58;240 | 56;239 | 64;250 | 49;231 | 47;228 | 47;226 | 51;227 | 62;248 |
| 61;338 | 55;016 | 50;045 | 52;038 | 41;308 | 55;021 | 56;017 | 54;012 | 49;011 | 45;056 |
| 48;287 | 60;316 | 70;359 | 68;345 | 63;007 | 62;321 | 61;316 | 57;313 | 54;316 | 64;003 |
| 57;016 | 43;040 | 34;053 | 36;052 | 28;062 | 42;043 | 44;041 | 43;038 | 39;039 | 29;060 |
| 37;307 | 45;321 | 45;315 | 53;339 | 49;352 | 47;325 | 46;322 | 43;319 | 39;318 | 50;350 |
| 41;088 | 25;116 | 11;163 | 15;146 | 18;180 | 23;121 | 25;116 | 28;115 | 30;120 | 17;175 |
| 83;166 | 72;102 | 55;119 | 60;114 | 56;116 | 70;105 | 72;104 | 74;085 | 74;080 | 57;115 |
| 59;028 | 43;051 | 31;064 | 34;063 | 26;075 | 41;054 | 43;052 | 43;049 | 40;050 | 27;072 |
| 54;311 | 58;345 | 61;024 | 60;013 | 53;026 | 59;351 | 59;346 | 56;342 | 51;343 | 54;024 |
| 44;292 | 55;316 | 66;353 | 63;342 | 59;000 | 57;321 | 56;317 | 53;314 | 49;316 | 60;357 |
| 40;291 | 52;311 | 65;343 | 61;333 | 58;352 | 54;315 | 53;311 | 50;309 | 47;310 | 59;349 |
| 90;000 | 19;260 | 35;285 | 30;279 | 36;283 | 21;265 | 19;263 | 17;252 | 19;240 | 35;282 |
| 53;317 | 56;350 | 58;025 | 57;015 | 50;027 | 57;355 | 57;351 | 54;346 | 49;347 | 51;025 |
| 63;346 | 55;024 | 48;051 | 50;045 | 41;054 | 54;029 | 55;025 | 54;020 | 49;019 | 43;052 |
| 57;026 | 41;048 | 30;058 | 33;058 | 24;070 | 39;051 | 41;049 | 41;047 | 38;048 | 26;067 |
| 52;014 | 39;034 | 32;043 | 34;043 | 25;051 | 38;037 | 38;032 | 39;033 | 34;035 | 27;049 |
| 38;281 | 53;300 | 67;330 | 63;322 | 61;343 | 55;304 | 54;301 | 50;298 | 48;300 | 62;339 |
| 67;337 | 60;024 | 53;057 | 55;049 | 46;059 | 60;030 | 61;025 | 59;019 | 55;018 | 48;057 |
| 53;223 | 70;232 | 77;199 | 77;215 | 85;205 | 72;231 | 70;231 | 70;304 | 72;247 | 84;209 |
| 27;081 | 11;126 | 09;254 | 07;220 | 15;233 | 09;137 | 10;1254 | 14;126 | 17;138 | 14;231 |
| 51;351 | 44;013 | 42;030 | 42;027 | 34;035 | 44;017 | 45;014 | 43;011 | 38;012 | 35;033 |
| 34;000 | 28;000 | 32;000 | 30;000 | 25;000 | 28;000 | 29;000 | 26;000 | 21;000 | 26;000 |
| 54;014 | 41;035 | 33;046 | 35;045 | 26;054 | 40;038 | 41;036 | 40;034 | 36;035 | 28;033 |
| 60;105 | 46;117 | 30;140 | 35;134 | 35;150 | 43;121 | 45;118 | 48;115 | 50;113 | 35;174 |
| 58;008 | 46;034 | 38;050 | 39;048 | 31;057 | 45;038 | 46;035 | 45;032 | 58;306 | 70;359 |
| 50;122 | 41;141 | 30;171 | 33;162 | 37;177 | 39;146 | 40;142 | 43;139 | 47;139 | 36;174 |
| 49;274 | 63;303 | 76;351 | 73;334 | 69;003 | 66;308 | 64;303 | 61;301 | 58'306 | 70;359 |
| 56;180 | 62;180 | 58;180 | 60;180 | 65;180 | 62;180 | 61;180 | 64;180 | 69;180 | 64;180 |
| 50;002 | 40;306 | 36;032 | 37;031 | 28;038 | 39;021 | 40;021 | 39;020 | 34;021 | 30;036 |
| 58;334 | 55;009 | 52;039 | 53;032 | 44;042 | 55;014 | 56;010 | 53;005 | 48;005 | 46;040 |
| 28;299 | 40;306 | 54;327 | 50;321 | 49;333 | 42;309 | 40'307 | 37;303 | 35;301 | 49;331 |

FIGURE 4B

APPARATUS AND METHOD FOR INDICATING DIRECTION

CROSS-REFERENCE TO RELATED APPLICATIONS

This application claims priority to U.S. Provisional Application No. 61/125,250, to Kilgus, filed Apr. 22, 2008.

BACKGROUND

Field of the Invention

This invention relates to directional pointing, and more specifically to an apparatus and system for pointing to a location.

SUMMARY

A pointing device adapted to allow a user to set a pointing arrow to point towards another location, such as a city in another country. The pointing arrow is adapted to not point in a direction along the surface of the earth but to point accurately through the Earth. An apparatus including a pointing device and a calculation portion adapted to allow the user to determine how to point the pointing arrow towards the desired location. The calculation portion may include an electronic device and may include the use of a global computer network.

BRIEF DESCRIPTION OF THE DRAWINGS

FIGS. 4A-B are an exemplary chart showing look out and look down angles according to some embodiments of the present invention.

DETAILED DESCRIPTION

Figure 1:
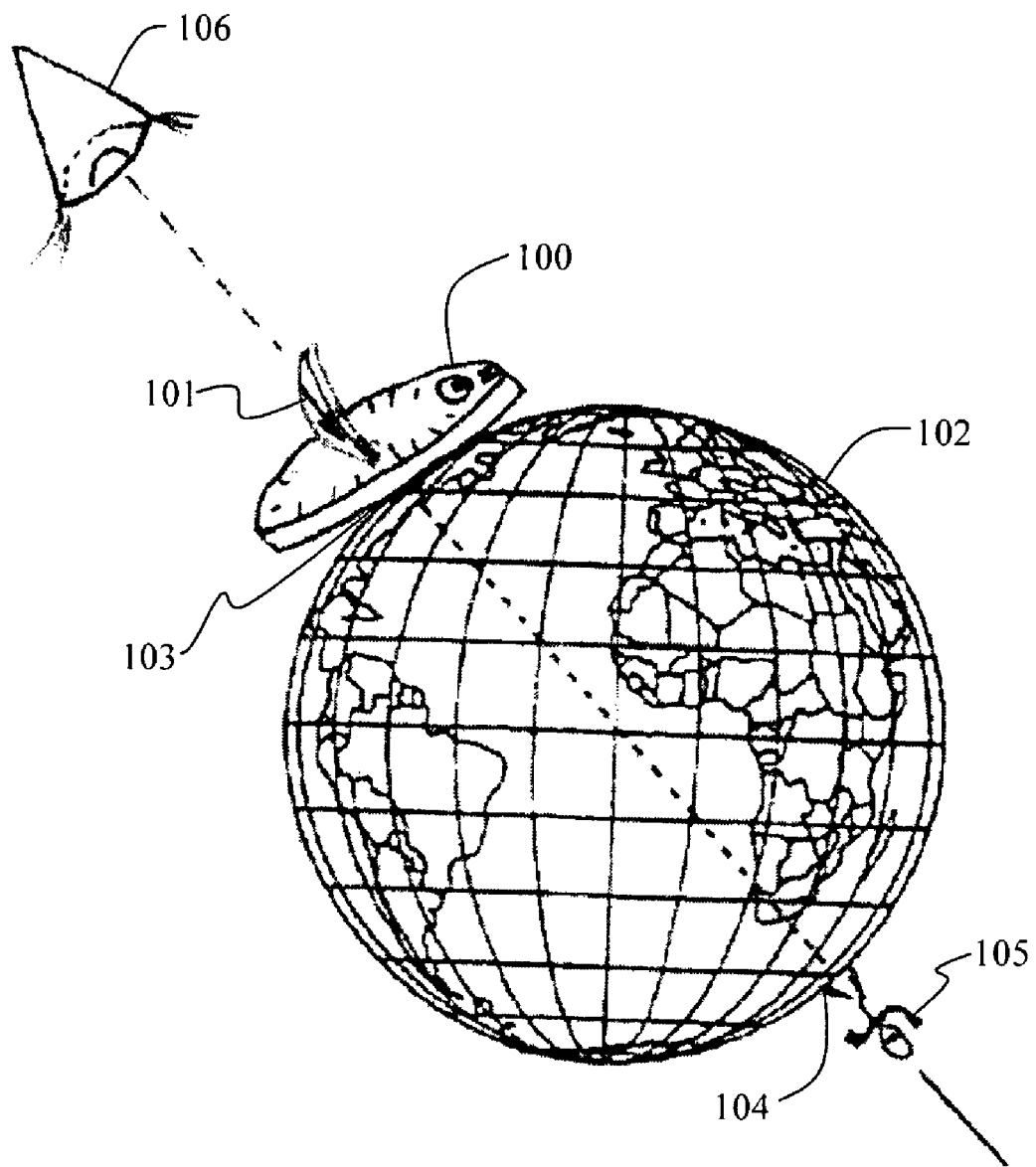
FIG. 1 is a conceptual illustration of the use of a pointing device according to some embodiments of the present invention.
Figure 2:
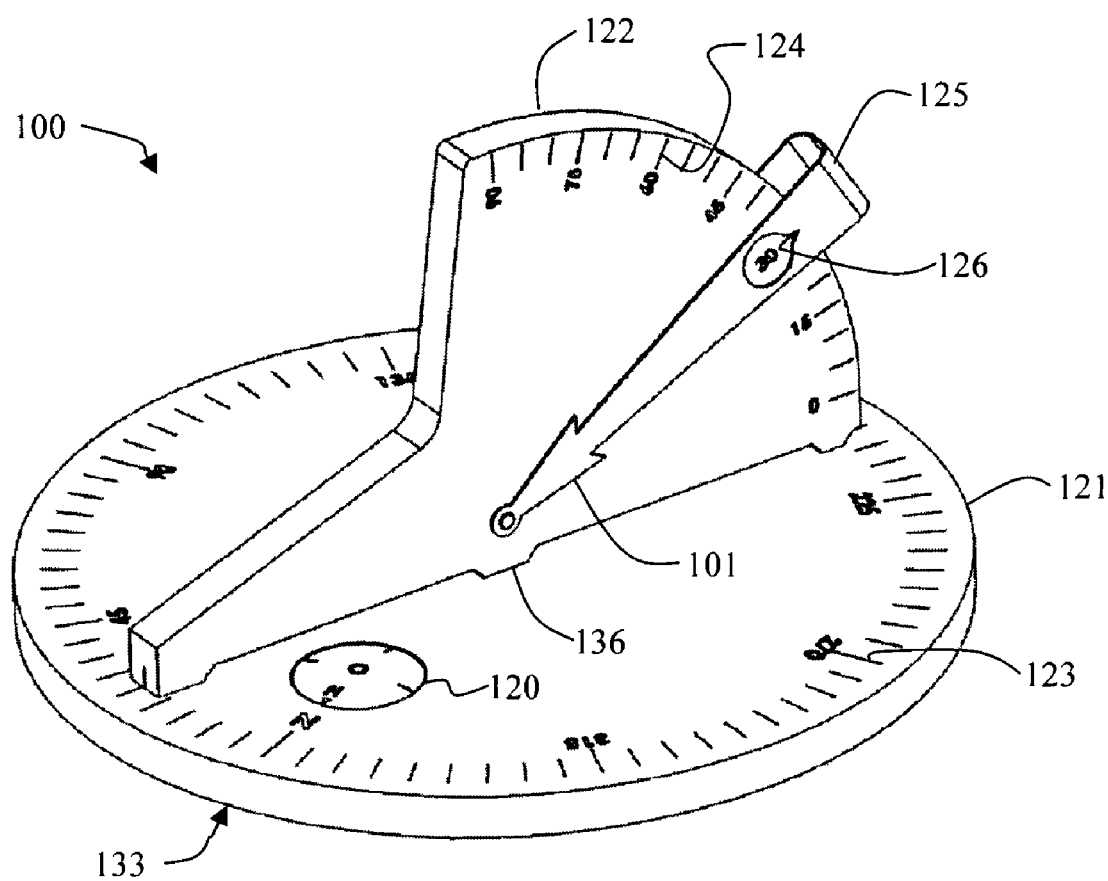
FIG. 2 is a perspective view of a pointing device according to some embodiments of the present invention.

In some embodiments of the present invention, as seen in FIGS. 1 and 2, a pointing device 100 is adapted to point an indicator 101 in a compass direction coupled with a look down angle. As seen in FIG. 1, an observer 106 is seen in a conceptual illustration at a point 103 on the surface of the Earth. The pointing device 101 is adapted such that the indicator may be set point at different location on the Earth 104, as well as a person 105 at the different location 104.

As seen in FIG. 2, the pointing device 100 has a pointer 125 which has an arrow indicator, or pointer, 101. The base 121 of the device 100 may have degree markers 123 which may be used to indicate compass direction. The degree markers 123 may be of a 0-360 degree scale. The base 121 is has a bottom surface 133 which is adapted to be placed upon a surface when the device is used, although the device 100 could also be held or otherwise suspended. In some embodiments, a compass 120 is embedded into the base 121, and may be used to allow for the alignment of the degree markers 123 on the base 121 to magnetic north.

As seen if FIG. 1, if a user desires to point an indicator from a first point on the Earth to a second point on the Earth, especially if the second point is at distance, the indicator may be set by using an offset from north in a rotation plane, which may be referred to as a rotation angle, and then by selecting a look down angle. Setting an indicator using the rotation angle and the look down angle thus provides the information necessary to achieve the desired pointing direction.

In some embodiments, a rotating partial disk, or sail 122, is adapted to reside on the base 121. The sail 122 may be pinned to the top surface of the base 121 such that it is perpendicular to the base 121, and such that the sail 122 may be rotated around a center point 136 of the base 121. The sail 122 may have degree markers 124 on its periphery, which may be from 0 to 90 degrees. A directional indicator 125 with a pointer 101 is adapted to be rotated on the sail such that the pointer may point down at a selected look down angle. The look down angle may be set using the degree markers 124 on the sail, and may be read using a window 126 in the directional indicator 125. The directional indicator 125 may be pinned to the sail 122 to allow for movement along a range of look down angles.

Figure 3:
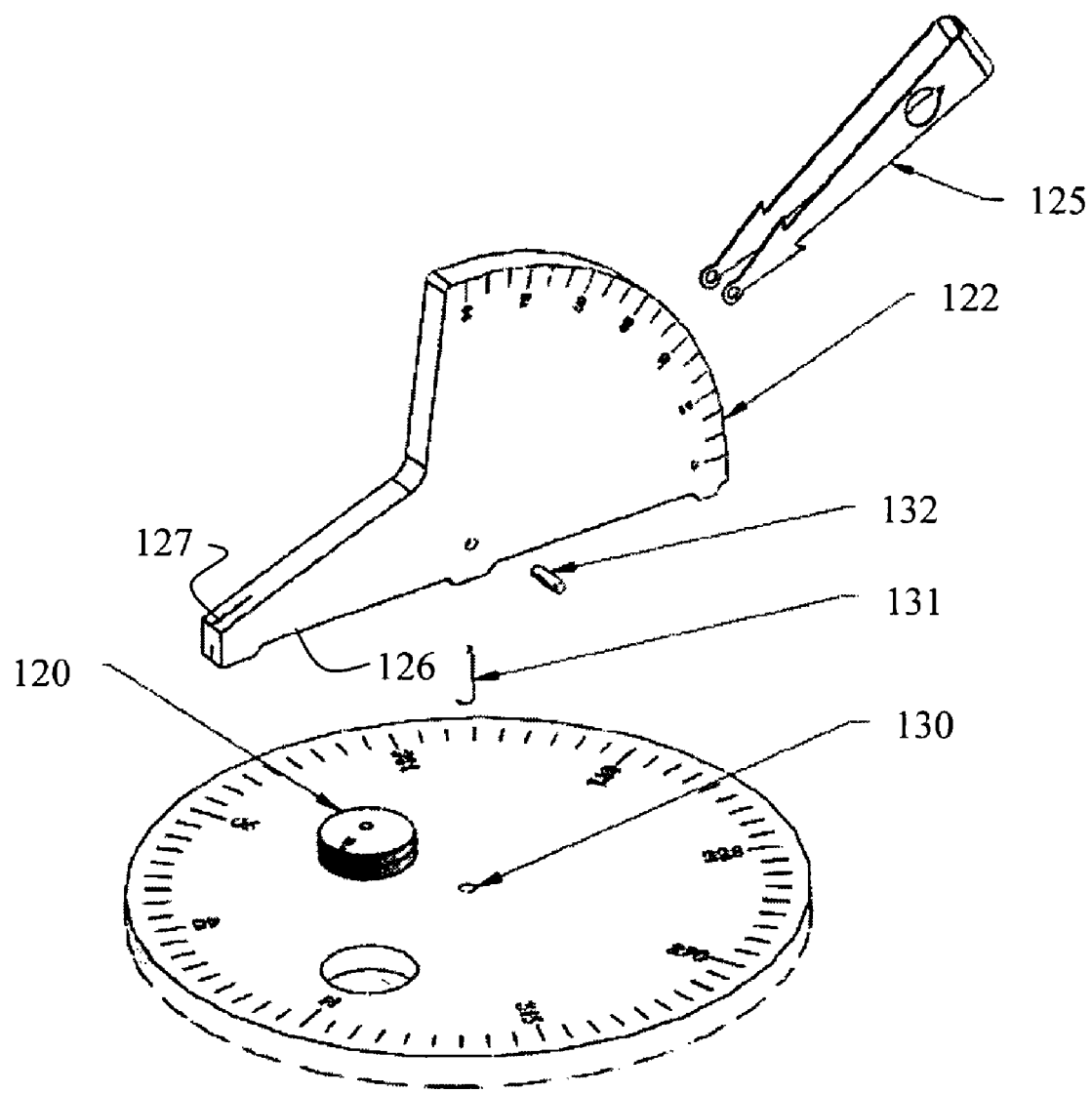
FIG. 3 is an exploded view of a pointing device according to some embodiments of the present invention.

FIG. 3 is an exploded view of a pointing device 100 according to some embodiments of the present invention. The base 121 is adapted to be placed upon a flat surface when the pointing device 100 is in use. A compass 120 may be inserted into a recess in the base 121. A base hole 130 is adapted to receive a base pin 131, which in turn receives a hole in the bottom of the sail 122. The sail 122 may have a marker 127 adapted to align the rotatable sail with a direction on the base. The directional indicator 125 may be rotatably pinned to the sail 122 with a sail pin 132. The sail 122 may have recesses 126 in its bottom surface to allow for clearance over the compass 120, or for ease of rotation, or for other reasons.

In use, the base may first be aligned with the compass to set the north indicator on the base to be aligned with the north of the compass. Next, the sail may be rotated to a pre-selected rotation angle by aligning the marker 127 with the corresponding degree marker on the base. Then, the directional indicator may be rotated to an angle corresponding to a pre-selected look down angle. If a user selects a pre-selected look out angle and look down angle to indicate the direction from the user's location to a selected second point on the Earth, and then orients the pointing device as described above, the pointer 101 will be pointing to the selected second point.

The pointing device may be used to set the pointer towards the location of a city of interest, of religious significance, or of other significance. The pointer will point towards the selected location directly, in the shortest line, as opposed to a direction along the surface of the Earth at the user's location. In another scenario, the user may want to point the pointer in the direction of a person, such as a loved one, that is at another location. The pointing device may be used to point as a reminder to the user where a selected location is. The pointing device may be used to remind the user of the location of a loved one.

In order to set the pointer properly, the user must know the rotation and look down angles associated with the selected second location with regard to the user's location. In some embodiments, as seen in FIGS. 4A-B, a lookup table 200 may be used. The table may include locations of the user in a column, and then a list of second locations across a top row. The rotation and look down angles are then seen in the location where the start location in the first column intersects with the second location in the top row. In the example of a lookup table as seen in FIGS. 4A-B, each intersection point between a start location in the first column and a second location across the top row is seen with two numbers together. The first number represents the look down angle, and the second number represents the rotation angle. These two numbers represent the values for the rotation and look down angles that a user would set the pointing device to in order to point at the selected second location from the user's location.

Figure 5:
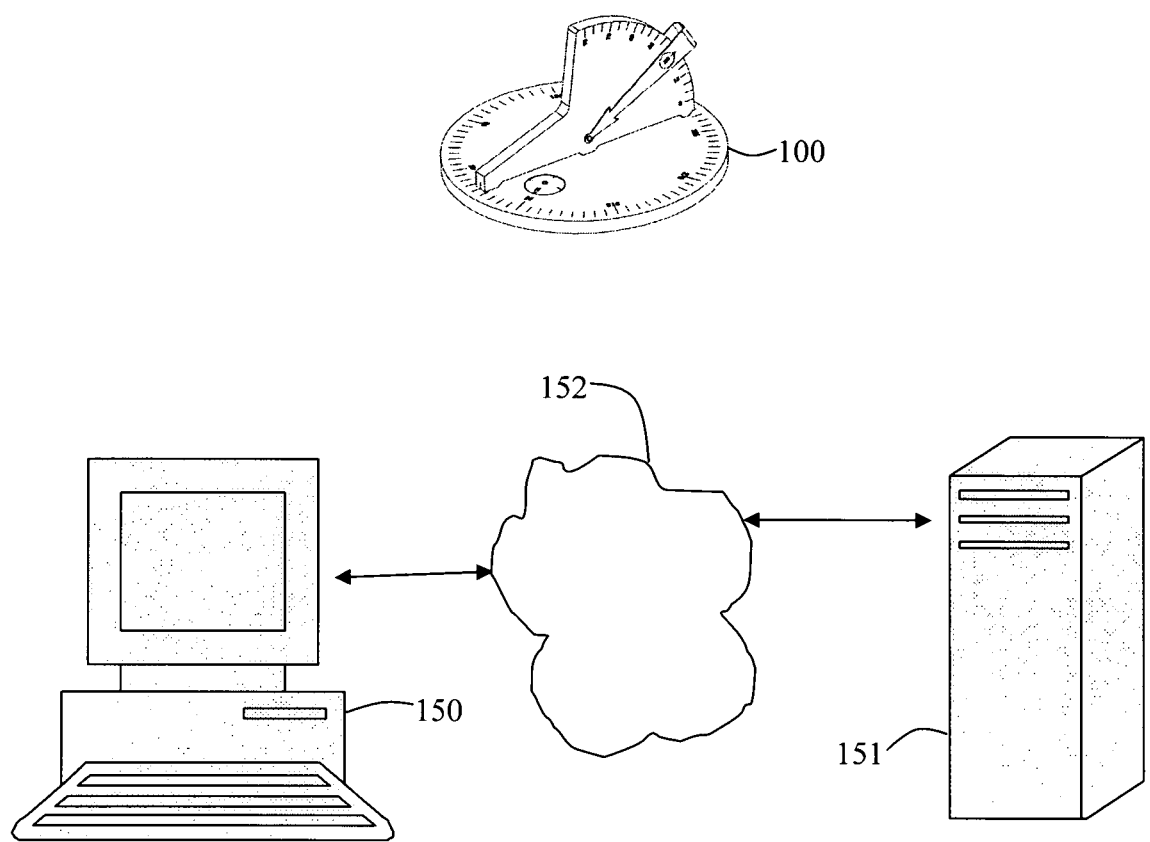
FIG. 5 is a sketch of a pointing device used with a computing device according to some embodiments of the present invention.

In some embodiments of the present invention, as seen in FIG. 5, an electronic computing device 150 may be used to determine the look out angle and the look down angle. The user's location and the location towards which the pointer is to be pointed may be entered into the electronic computing device 150. The inputs may be put in using city data, or latitude and longitude. In some embodiments, the electronic computing device 150 may contain code for determining the angles, and the code may be contained on a computer readable medium. In some embodiments, the electronic computing device 150 may be connected to an electronic system 151 via a global area computer network 152, such as the Internet. The electronic system may contain a computer program product containing code for determining a rotation angle and a look down angle as described above.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

I claim:

1. A pointing device, said pointing device comprising:
   a base, said base being substantially planar, said base having a top surface;
   an upright portion, said upright portion rotatably attached to said base; and
   a pointer, said pointer pivotally attached to said upright portion.

2. The pointing device of claim 1 wherein said base comprises a circular disc.

3. The pointing device of claim 2 wherein said upright portion comprises a substantially planar plate, and wherein said plate is rotatably attached to the center of said top surface of said base.

4. The pointing device of claim 3 wherein said base further comprises angle markers.

5. The pointing device of claim 4 further comprising a compass, said compass attached to said base.

6. The pointing device of claim 1 wherein said pointer is adapted to pivot through a range from a first position pointing parallel to said top surface of said base to a second position pointing perpendicular into said top surface of said base.

7. The pointing device of claim 5 wherein said pointer is adapted to pivot through a range from a first position pointing parallel to said top surface of said base to a second position pointing perpendicular into said top surface of said base.

8. The pointing device of claim 7 wherein said upright portion further comprises angle markers, said angle markers adapted to read the angle of said pointer relative to said top surface of said base.

9. A method for pointing a pointer from one location on the surface of the Earth towards another location on the surface of the Earth, said method comprising the steps of:
   determining a first location of the user;
   determining a second location to which the user desires to point;
   acquiring a rotation angle and a look down angle based upon said first location and said second location; and
   pointing a pointer of a pointing device from said first location to said second location.

10. The method of claim 9 wherein the step of acquiring a rotation angle and a look down angle comprises looking up said angles from a table of first locations and second locations.

11. The method of claim 10 wherein the step of pointing a pointer of a pointing device comprises:
    rotating the pointer to said rotation angle; and
    rotating the pointer to said look down angle.

12. The method of claim 9 wherein the step of acquiring a rotation angle and a look down angle comprises:
    inputting said first location into an electronic computing device;
    inputting said second location into an electronic computing device; and
    receiving a rotation angle and a look down angle from said electronic computing device.

13. The method of claim 12 wherein said electronic computing device comprises a computer connected to an electronic system by a global area computer network.

14. The method of claim 13 wherein said electronic system comprises a computer program product, said computer program product comprising a computer-readable medium comprising:
    code for causing at least one computer to determining a rotation angle and a look down angle based upon an initial position and a location desired to be pointed at.

15. A computer program product, said computer program product comprising a computer-readable medium comprising:
    code for causing at least one computer to determining a rotation angle and a look down angle based upon an initial position and a location desired to be pointed at.

16. The computer program product of claim 15 wherein said initial position is entered as longitude and latitude.

17. The computer program product of claim 16 wherein said location desired to be pointed at is entered as longitude and latitude.

* * * * *